Feb. 21, 1961 G. E. BOLLIBON ET AL 2,972,309
MOTOR-PUMP UNIT
Filed Sept. 3, 1958 3 Sheets-Sheet 1

WITNESSES
Edwin E. Bassler
James F. Young

INVENTORS
George E. Bollibon &
Michael Stark
BY
Donald J. Smith
ATTORNEY

Feb. 21, 1961    G. E. BOLLIBON ET AL    2,972,309
MOTOR-PUMP UNIT
Filed Sept. 3, 1958    3 Sheets-Sheet 2

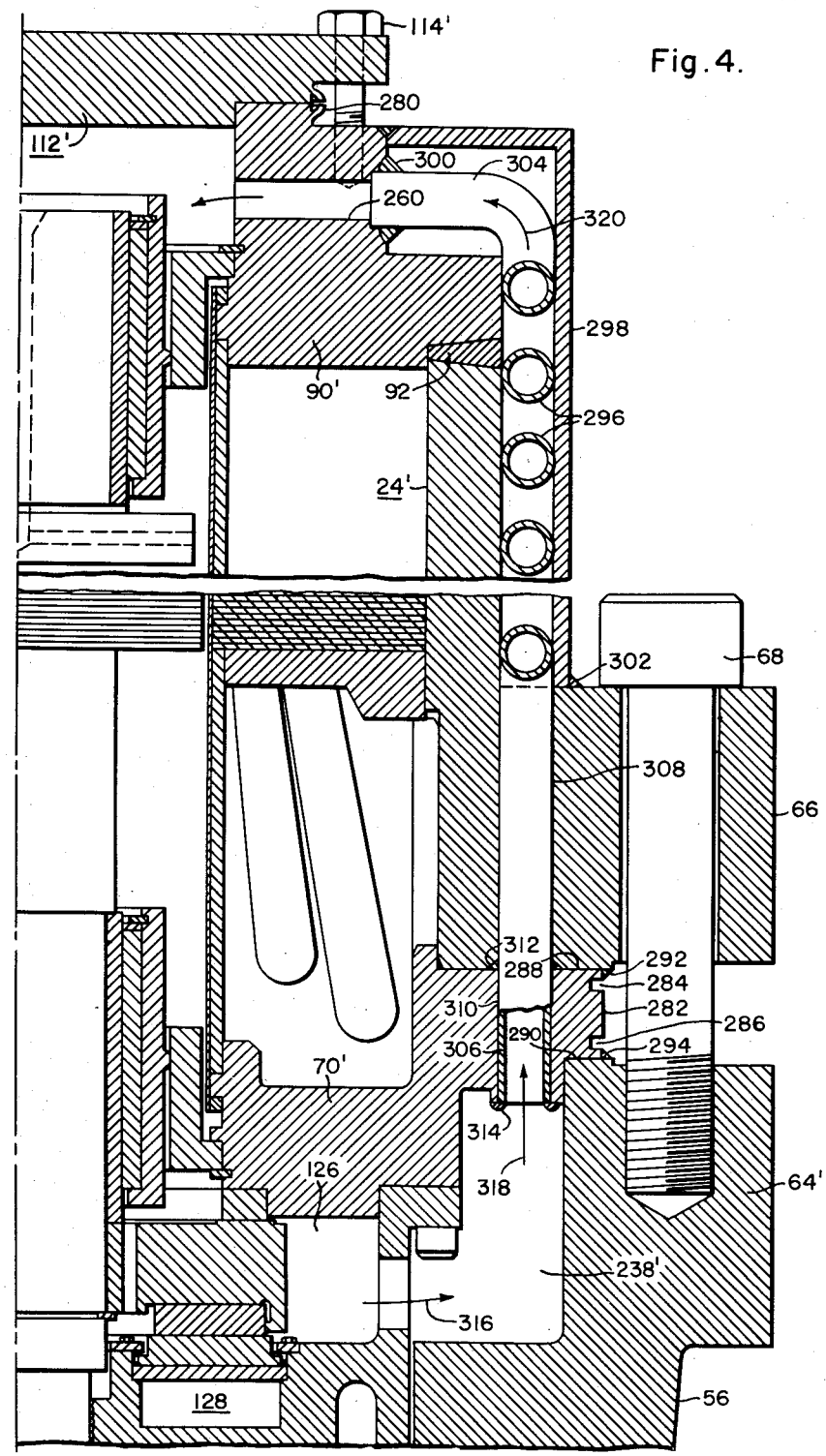

United States Patent Office 2,972,309
Patented Feb. 21, 1961

2,972,309

MOTOR-PUMP UNIT

George E. Bollibon, Penn Hills Township, Allegheny County, and Michael Stark, Oakmont, Pa., assignors to Westinghouse Electric Corporation, East Pittsburgh, Pa., a corporation of Pennsylvania Filed Sept. 3, 1958, Ser. No. 758,809

14 Claims. (Cl. 103—87)

The present invention relates to motor pumps and more particularly to a motor-pump adapted for pumping fluids at elevated temperatures in which the bearings of the pump are lubricated by the fluid being pumped.

Motor-pump units of the character described frequently are employed in sealed applications wherein a high temperature fluid being handled by the pump is also employed to lubricate the bearings of the electric motor associated with the pump and to remove electrical and other losses from the motor section. Since the fluid pumped frequently is a poor lubricant, for example, water, it follows that it is essential to afford an adequate supply of the lubricant to the bearings. The lubricant moreover must be cooled in most applications to a temperature considerably below that of the fluid circulating through the pump casing of the motor pump unit.

Inasmuch as one of the radial bearings usually employed in the motor section for mounting the rotor and impeller shaft of the motor pump unit and also the thrust bearing arrangement are disposed at the lower end of the motor section adjacent the pump casing, the transfer of heat through the structural components of the motor pump unit from the pump casing to these bearings must be minimized insofar as possible. This transfer of heat is diminished by the provision of one or more thermal barriers of which this invention contemplates an improved and novel design.

It is also desirable, in the motor-pump unit of the character described, to provide means for equalizing pressures between the motor and pump sections without, however, permitting free flow of high temperature fluid from the pump casing to the motor housing of the unit. This is accomplished by means of labyrinthine seals which are associated with a novel thrust bearing holder and thermal barrier contemplated by the invention. In a certain aspect of the invention the labyrinthine seal arrangement thereof also is employed to prevent undesirable flow of the bearing coolant into portions of the pump casing.

In certain applications of the motor-pump unit wherein the latter is associated with a hermetically sealed system, it is necessary to provide a heat exchanger or cooling means for the bearing lubricant which can be hermetically sealed within the motor pump housing. In other arrangements, of course, the lubricant can be cooled externally, and means are provided by the invention for readily adapting a motor-pump unit for either an external or internal cooling system. As a consequence, the motor-pump unit can be hermetically sealed with a minimum of time and expense. In furtherance of this purpose any gasketing employed in the motor-pump unit desirably is loaded, according to the invention, by the main mounting bolts employed to secure the motor housing to the pump casing of the unit.

In the operation of the motor-pump unit, a down-thrust of the rotor and impeller shaft, referring to a vertical operating position, usually is occasioned by rotation of the impeller. However, external pressure surges frequently are encountered which make desirable the use of means for preventing or absorbing up-thrust of the rotor and impeller shaft. It is also desirable to provide means for relatively easy removal of the stator assembly from the motor-pump unit for purposes of repair or replacement. Such removal is facilitated by the invention, particularly where the stator assembly is hermetically sealed.

It is therefore an object of the invention to provide a novel and efficient motor pump unit adapted particularly for pumping fluids at elevated temperatures.

Another object of the invention is the provision of a motor pump unit having improved means for lubricating or cooling the bearings thereof.

Still another object of the invention is to provide a motor-pump unit having improved means for facilitating removal of the stator assembly therefrom.

A further object of the invention is the provision of a novel thermal barrier arrangement adapted for use with a motor-pump unit.

A still further object of the invention is the provision of a novel thermal barrier and thrust bearing holder arrangement.

Another object of the invention is the provision of a motor-pump unit having novel and improved means associated with the driving shaft thereof for absorbing both upward and downward thrust thereof.

Still another object of the invention is the provision of a motor-pump unit having improved means for equalizing the operating pressures of the motor and pump sections thereof and for minimizing or eliminating flow of fluid from the pump casing to the motor housing.

A still further object of the invention is the provision of an improved thermal barrier and labyrinthine seal arrangement.

Another object of the invention is the provision of a novel and efficient motor-pump unit adapted for hermetic sealing within the system with which the unit is utilized. More particularly, the invention contemplates a motor-pump unit of this nature having a hermetically sealable bearing lubricating and cooling system, which in addition is arranged for removing motor losses of the unit.

In the forth-coming detailed description of the invention, the foregoing and additional objects, features and advantages of the invention will be elaborated upon. The following description is to be read in conjunction with the accompanying drawings, wherein:

Fig. 4 is an elevational view, partially sectioned, of another form of a motor-pump unit according to the invention.

Figure 2:
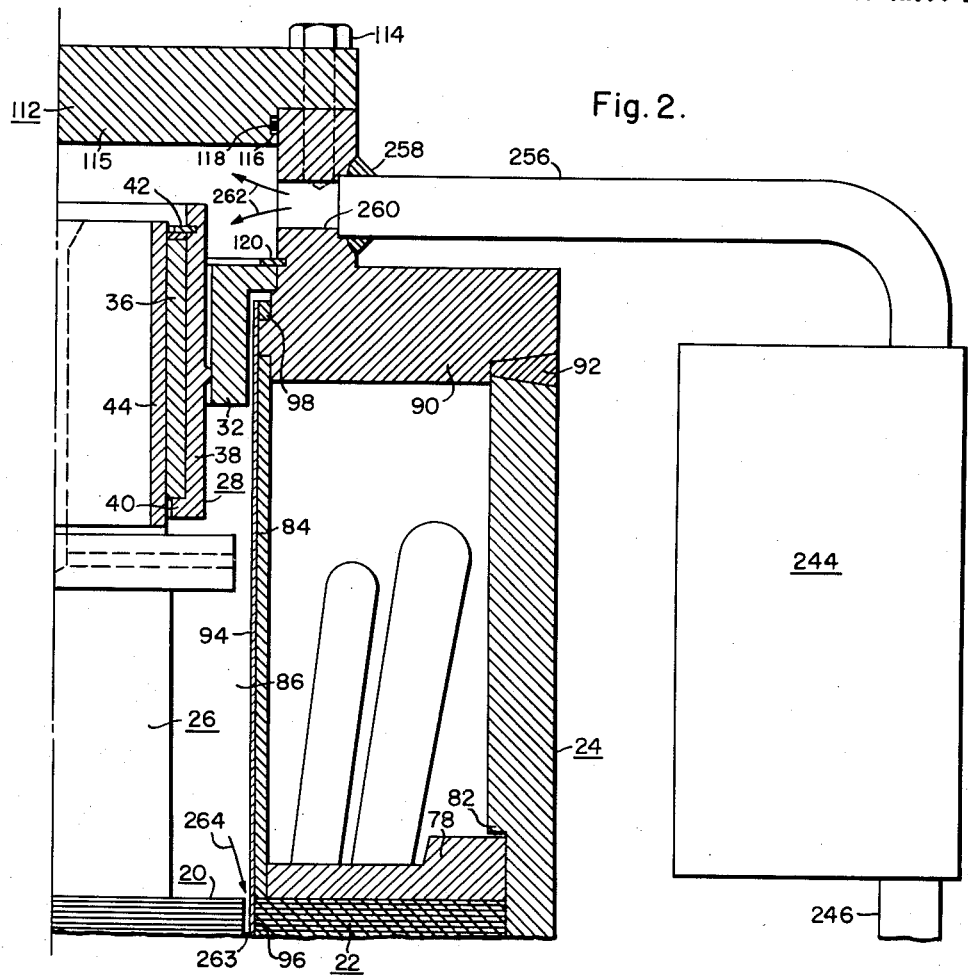
Fig. 2 is a longitudinally sectioned, partial view of the motor-pump shown in Fig. 1 and taken along reference line II—II thereof.
Figure 1:
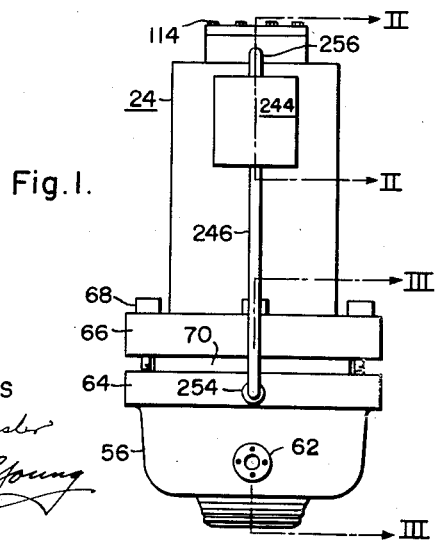
Figure 1 is an elevational view of one form of a motor pump unit arranged in accordance with the invention.
Figure 3:
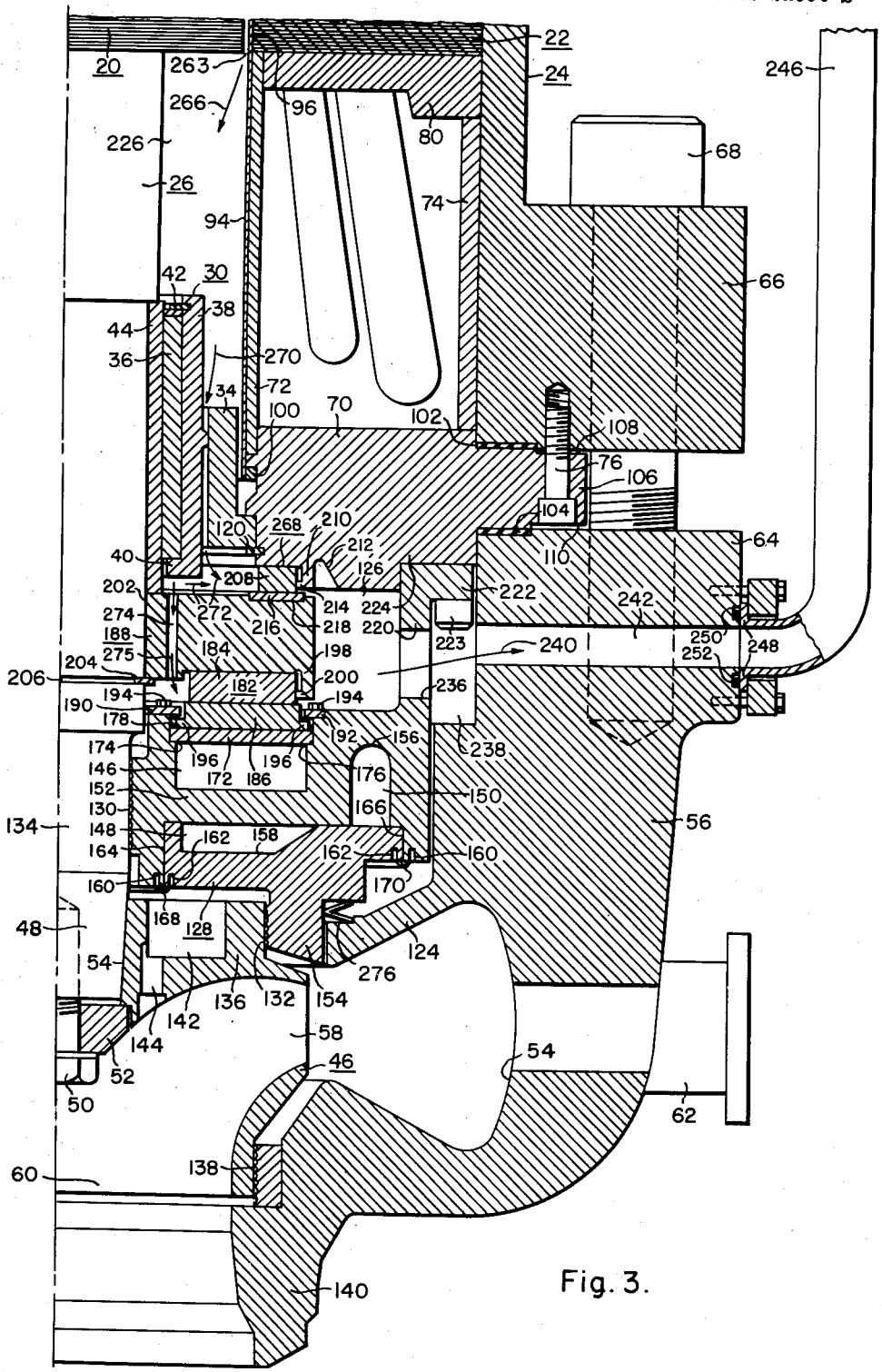
Fig. 3 is a longitudinally sectioned, partial view of the motor-pump shown in Fig. 1 and taken along reference line III—III thereof.

Referring now to Figs. 1–3 of the drawings, the exemplary form of the invention shown therein comprises a squirrel cage type rotor 20, a stator assembly 22, and a housing 24 enclosing the rotor and stator. The stator 22 is of generally tubular configuration, in the interior of which the rotor 20 is mounted on a driving shaft 26 for rotation therewith.

The driving shaft 26 in this arrangement is mounted for rotation within a pair of radial or sleeve type bearings denoted generally by the reference numerals 28 and 30. The bearings 28 and 30 are supported within a pair of flanged tubular brackets 32 and 34, respectively, which are supported by the housing 24 in a manner described hereinafter. The bearing sleeve 36, which can be fabricated from suitable bearing material such as graphite, is retained in a bearing housing 38 by means of an inner lip 40 formed at the lower end of the housing as viewed in Figs. 1–3 and by a snap ring 42 disposed in a groove adjacent the upper end of the housing 38. When thus mounted, the bearing sleeve 36 engages a journal sleeve 44 formed from Stellite or other hard material and shrunk fitted up the driving shaft 26.

At the lower end of the driving shaft 26, a pumping impeller 46 is driven upon the tapered end portion 48 of the driving shaft by means of a mounting bolt 50 and retaining washer 52. The mounting aperture 54 of the impeller likewise is tapered in a manner complementary to the tapered surface 48 in order to obtain a secure fit between the driving shaft 26 and the impeller 46. In this arrangement the impeller 46 is suspended by the driving shaft 26 in a volute 54 formed within the pump casing 56. The impeller, of course, by means of suitably disposed vanes or plates 58, is adapted upon rotation to draw fluid into the eye 60 of the impeller and to discharge the fluid at a higher head into the volute 54 from which the fluid exits by means of the pump outlet port 62. The upper end 64 of the pump casing is joined to a mounting flange 66 formed at the lower end of the motor housing 24 by means of a plurality of mounting bolts 68.

The stator assembly 22 is retained within the motor housing 24 by means of an annular plate 70, a back-up ring or cylinder 72 and a spacing cylinder 74. The annular plate 70 is joined to the undersurface of the mounting flange 66 by means of bolts 76. The stator assembly is provided with a pair of end rings 78 and 80 with the lower end ring 80 being spaced from the annular plate 70 by means of the spacing cylinder 74. The spacing cylinder 74 is closely fitted within the lower end portion of the housing 24, but is removable therefrom for purposes of removing the stator 22 from the housing 24. The upper end of the stator 22 is retained by means of an annular shoulder 82 formed on the inner periphery of the housing 24 adjacent its upper end and engageable with the upper end ring 78 of the stator 22. A similar back-up sleeve 84 is provided at the upper end of the stator 22 and adjacent the rotor cavity 86. Desirably, the back-up sleeves merely are to be seated against the adjacent components in a "slip-fit" arrangement, although these components can be joined rigidly, as by welding. The end portion 90 is joined to the housing 24 with an annular weld 92.

When thus positioned within the housing 24, the stator assembly 22 is hermetically sealed therein by means of the stator "can" or enclosure 94. The can is fabricated from an impervious material such as stainless steel and being relatively thin, is supported throughout its length by bore 96 of the stator and by the back-up sleeves 72 and 84. The can 94 is joined at its ends to the annular plate 70 and the housing end portion 90 by means of annular sealing welds 98 and 100.

Sealing of the stator assembly 22 within the housing 24 and the can 94 is completed by means of a gasket 102 inserted between the annular plate 70 and the mounting flange 66 of the housing. The gasket 102 initially is retained by the annular plate mounting bolts 76, but after assembly of the motor pump the gasket 102 is fully loaded by the motor pump mounting bolts 68. A similar gasket 104 is inserted between the annular plate 70 and the pump casing 56 in order to prevent the escape of fluid therefrom. The gasket 104 likewise is fully loaded after assembly of the pump as pointed out in connection with the gasket 102. In furtherance of this purpose, the outer edge portion 106 of the annular plate 70 is reduced in thickness in order to provide clearances 108 and 110 between this portion of the annular plate and the adjacent surfaces of the mounting flange 66 and pump casing 56, respectively. The upper end of the housing 24 is closed and sealed by means of a closure member 112 secured to the housing end member 90 by means of bolts 114. The closure 112 is provided with a stepped configuration, the reduced portion 115 of which is inserted into the open end of the housing end portion 90. The reduced portion 115 is provided with a peripheral groove 116 in which a sealing O-ring 118 is inserted for engagement with the adjacent inner wall surface of the end member 90.

When removing the stator assembly 22 for replacement or repair, it is only necessary to loosen the mounting bolts 68 and to remove the casing 56 from the housing 24. This operation exposes the components of the pump end of the motor pump unit including the impeller 46, the thermal barrier 128 and the thrust runner 188. The impeller is disassembled by removing the bolts 50 and washer 52 after which the thermal barrier 128 can be removed from the stator plate 70 by loosening the bolts 223. The thrust runner 188 is then disengaged from the shaft 26 by removing its retaining ring 204. The retaining ring 120 for the lower radial bearing bracket 34 is now accessible, and following removal of the bracket 34 the rotor 20 and shaft 26 can be withdrawn downwardly as viewed in Figs. 1–3 and removed from the lower open end of the stator assembly 22. The annular lower plate 70 is then removed from the stator assembly 22 and motor housing 24 by breaking the lower stator can weld 100 and by removing the mounting bolts 76, respectively. The stator assembly 22 then can be removed from the lower open end of the motor housing 24 by withdrawing downwardly through the annular space between the stator can 94 and the housing 24. At the same time the lower back-up sleeve 72 and the spacing cylinder 74 are removed, since these components are slidably mounted with the stator assembly, as aforesaid.

As seen in Fig. 3 of the drawings, the pump volute 54, which is partially enclosed by an integral down turned flange 124, is separated some distance from the annular plate 70 forming part of the motor housing 24. The major proportion of the annular space 126, which is thus enclosed within the pump casing 56 and surrounds the driving shaft 26, is filled with a bipartite thermal barrier arrangement and denoted generally by the reference character 128. A pair of labyrinthine seals 130 and 132 are formed on the thermal barrier 128 and disposed adjacent a closely machined portion 134 of the driving shaft and hub 136 of the impeller 46. The labyrinthine seals 130 and 132 are formed, for example, by a parallel series of annular grooves formed on inner peripheral surfaces of the thermal barrier which result in series of parallel ridges. The ridges are each spaced a short distance from the adjacent driving shaft or impeller hub to prevent binding therebetween. However, the clearances are relatively small so that fluid flows through the labyrinthine seals only in seepage amounts, if at all. The seepage flows, however, is adequate to equalize fluid pressure in the interior of the motor pump unit.

The thermal barrier 128 therefore is designed to prevent the flow of high pressure fluid from the volute 54 to the motor housing 24, and a similar labyrinthine seal 138 is formed adjacent the eye 60 of the impeller 46 to prevent the flow of fluid back into the intake port 140 of the motor pump. The labyrinthine seal 130 likewise prevents a significant flow of fluid between the motor housing 24 and the pump casing 56. Thus, in the event that the bearing lubricant at this point is at a higher pressure than that of the fluid in the impeller suctional cavity 142, the seal 130 substantially prevents flow of bearing lubricant into the cavity 142 and thence into the impeller 46 through the connecting port 144. As is well known, the suctional cavity 142 and port 144 are provided for the purpose of counteracting the normal downward thrust of the impeller during operation of the motor pump unit.

In this arrangement of the invention the thermal barrier 128 is adapted to enclose a plurality of cavities or voids 146, 148 and 150 therein. Accordingly, the thermal barrier 128 comprises a pair of cooperating annular members 152 and 154 which are each provided with an annular groove 156 or 158 formed respectively in the confronting surfaces of the members 152 and 154 and radially spaced. Leakage of the motor pump fluid into the cavities 150 and 148 formed by the grooves 156 and 158 is prevented by hermetically sealing the members 152 and 154 to one another. In furtherance of this purpose, the members 152 and 154 are each furnished with a pair of grooves 160 or 162 formed adjacent the inner and outer peripheral junctions 164 and 166 therebetween. The junctions are then hermetically sealed by annular sealing welds 168 and 170, respectively. The provision of the annular grooves 160 and 162 facilitates making the welds 168 and 170 and additionally provides access thereto for cutting the welded junctions in the event the thermal barrier 128 must be disassembled.

The remaining thermal barrier cavity 146 is closed and sealed by an annular plate 172 which rests upon a pair of inwardly extending annular shoulders 174 and 176 formed at the side walls of the cavity 146. When positioned in this manner, the plate 172 is hermetically sealed to the thermal barrier 128 by annular sealing welds 178 and 180 to prevent access of the pump fluid to the cavity 146. With this arrangement then a total of three stagnant or vacant cavities 146, 148 and 150 are hermetically sealed within the thermal barrier 128 with the result that the flow of heat from the pump casing 56 to the motor housing 24 and particularly to the internal components of the motor section is reduced greatly. These cavities particularly are arranged to prevent the transfer of heat to the thrust bearing denoted generally by the reference character 182.

In the arrangement of the invention as depicted in Fig. 1, the thrust bearing 182 is shown schematically as a hardened bearing member 184 which is seated on a base member 186. However, the thrust bearing 182 may be provided with a typical Kingsbury type arrangement or, alternatively, the thrust bearing described and claimed in the copending application of Benjamin Cametti et al., entitled "Bearings," Serial No. 440,827, filed July 4, 1954, now Patent 2,874,007, and assigned to the present assignee. In these latter-mentioned bearing arrangements, the bearing member 186 is formed from an annular series of shoes or pads which are tiltable to compensate for any very slight unevenness in thrust runner 188. To provide the necessary space for the latter bearing arrangements, the annular plate 172 can be seated lower in the cavity 146 or can be eliminated altogether.

The base member 186 rests upon the annular plate 172 forming part of the thermal barrier 128 and is secured in position by a pair of retaining rings 190 and 192. The retaining rings, in turn, are secured by a plurality of bolts 194 and cooperate with shoulders 196 formed at the inner and outer peripheries of the base member 186. The bearing member 184 is positioned radially of and secured to the thrust runner 188 by means of a continuous downwardly extending outer projection 198 formed integrally with the thrust runner 188. The projection 198 terminates in an inwardly extending lip 200 which is engageable with the outer peripheral edge of the bearing member 184. With this arrangement, the bearing member is maintained coaxially of the thrust runner 188.

Alternatively, the bearing member 184 can be fabricated in the form of a continuous annular member as shown and can be mounted for rotation with the thrust runner 188 as by shrink fitting the bearing member against the lip 200.

The thrust runner 188 is provided with a central opening 202 whereby the thrust runner is mounted upon the driving shaft 26. When thus mounted, the thrust runner is positioned by the lower journal sleeve 44 of the driving shaft 26 and secured by means of a retaining ring 204 mounted in a peripheral groove 206 at the lower surface of the thrust runner 188.

A second bearing assembly 268 is mounted for upthrust relief in the annular plate 70 disposed as aforesaid generally between the housing 24 and the pump casing 56. The bearing assembly 268 includes a bearing member 208 fabricated from a bearing material such as graphite, which in this example desirably is shrunk-seated against a shoulder 210 formed on the undersurface of the annular plate 70. An annular indent or groove 212 is formed also on the underside of the annular plate 70, but disposed radially outwardly of the shoulder 210. This groove permits a limited amount of radial expansion of the shoulder 210 when the bearing member 208 is shrunk-seated against the shoulder 210. The shoulder 210 is provided with an inner lip 214. The lip 214 need project only far enough to prevent the upper outer edge of the bearing member 208 from contacting the base of the shoulder 210. When the motor pump unit is assembled, the bearing member 208 is positioned so as to engage or very nearly engage a hardened insert 216 positioned in an annular groove 218 formed on the upper surface of the thrust runner 188. With this arrangement, any upthrust imparted to the driving shaft 26 is transferred to the annular plate 70 which is firmly mounted between the mounting flange 66 of the housing 24 and the upper end 64 of the pump casing 56.

It will be seen from Fig. 3 that the thrust runner 188, the thrust bearing 182 and the up-thrust bearing member 208 are enclosed within the space 126 confined by an upwardly extending tubular projection 220. The space 126 communicates with the lower portion 226 of the rotor cavity through the aforementioned thrust bearings and through the mating parts of the lower radial bearing 30. The tubular projection 220 terminates in an outwardly extended flange 222, whereby the projection 220 and thermal barrier 128 are positioned within an annular stepped portion 224 of the annular plate 70 when the motor housing 24 is bolted to the pump casing 56. With this arrangement, of course, the thermal barrier and associated components are positioned radially of the annular plate 70 and hence of the driving shaft 26, and are secured to the annular plate 70 by a plurality of bolts 223.

Means are provided by the invention to circulate a bearing lubricant through the rotor cavity 86 and through the bearings 28, 30, 182 and the aforesaid up-thrust bearing 208. This circulation is particularly desirable where the fluid being pumped, and in addition being circulated through the motor housing, is a relatively poor lubricant, such as water. Since the bearing lubricant also is employed to remove electrical and other losses from the stator and rotor, means are also associated with the lubricant stream for cooling the latter.

The lubricant and coolant can be circulated through the rotor cavity by means of lubricant pump located at the upward end of the shaft 26 and described in a copending application of G. E. Bollibon et al., entitled "Canned Motor Pump," filed July 10, 1958, Serial No. 747,771 and assigned to the present assignee.

From the annular chamber 126 the lubricant flows through a plurality of openings 236 in the tubular projection 220 and enters a second annular chamber 238 as indicated by flow arrows 240. In the chamber 238 the lubricant is collected and is carried outwardly through a transverse passage 242 extending through in the upward end portion 64 of the pump casing 56.

An external heat exchanger, denoted by the reference character 224, is coupled to the passage 242 by means of its inlet conduit 246. The inlet conduit 246 is provided at its lower end with a flange 248, which, when the conduit 246 is aligned with the outlet passage 242, overlies an annular groove 250. In the groove 250 is positioned a sealing O-ring 252, and leakage at the junction between the pump casing and the conduit 246 is prevented by a ring clamp and mounting bolt arrangement denoted generally by the reference character 254.

The cooled fluid leaving the heat exchanger or cooler 244 is returned to the upper end of the motor housing 24 through conduit 256. The conduit 256 is joined to the upper end member 90 of the housing 24, for example, by annular weld 258. When thus positioned, the conduit 256 is aligned with an inlet passage 260 extending through the vertical wall portion of the end member 90. The lubricant entering the motor housing 24 as denoted by flow arrows 262 passes downwardly through the upper bearing 28 and thence through motor gap 263 as denoted by arrows 264 and 266. While passing through the gap 263, the lubricant, of course, removes heat developed through motor losses from the rotor 20 and the stator assembly 22.

Upon issuing from the gap 263, the lubricant continues to flow downwardly through the lower radial bearing 30 and thence outwardly through the up-thrust bearing arrangement 268 as denoted by flow arrows 270 and 272. The down thrust bearing 182 is lubricated by means of fluid flowing downwardly through one or more apertures 274 in the thrust runner 188, as denoted by flow arrow 275. Communication between the annular chamber 238 and the pump volute 54 is prevented by means of an annular sealing member 276 arranged in the form of a V-shaped spring.

Referring now to Fig. 4 of the drawings, the motor-pump shown therein and arranged in accordance with the invention is adapted in this example for incorporation within a hermetically sealed system. In the latter arrangement, the housing 24' is provided with a top cap or closure 112' which is hermetically sealed to the end member 90'. As indicated previously, the end member is joined to the housing 24' by an annular structural and sealing weld 92. The junction between the top cap 112' and the end member 90' is hermetically sealed by a weld container or hermetic sealing means denoted generally by the reference character 280. The load imparted to the top cap, however, is borne by a plurality of mounting bolts 114'. Suitable forms of weld containers or sealing means 280 are provided such as are more particularly described and claimed in Patent 2,805,789, issued September 10, 1957 to E. J. Kreh et al., and assigned to the assignee of the present application.

The junction between the housing flange 66 and the upper end 64' of the pump casing 56 and the annular plate 70' are hermetically sealed in a similar manner. In furtherance of this purpose, outer edge 282 of the mounting plate 70' is provided with a pair of circumferential grooves 284 and 286 which are disposed adjacent junctions 288 and 290, respectively. The junctions 288 and 290 then are hermetically sealed by annular welds 292 and 294, respectively. The provision of the grooves 284 and 286 facilitates making the welds 292 and 294 and cutting or severing these welds when it is desired to disassemble the motor pump unit. The annular plate mounting bolts 76 (Fig. 3) are not employed, since the annular plate 70' is joined to the mounting flange 66 by a sealing weld 292 and by means presently to be described, and because the load at the junctions 288 and 290 are carried by the mounting bolts 68.

In the hermetically sealed arrangement of Fig. 3 the heat exchanger or lubricant cooler is completely and hermetically sealed within the motor pump unit. In this arrangement the heat exchanger is formed from a length of coiled tubing 296, which is wrapped around the outer periphery of the motor housing 24'. The coil 296, if desired, can be hermetically sealed within an outer tubular jacket 298, which, in turn, is hermetically sealed to the motor housing 24' by means of annular sealing welds 300 and 302 which join the ends of the jacket 298 to the end member 90' and the housing flange 66, respectively. Heat is removed from the coil 296 by circulating a heat-exchanging fluid between the coil 296 and the inner wall of the jacket 298.

The upper end 304 of the coiled tubing is hermetically sealed at the lubricant inlet opening 260 as described heretofore in connection with the heat exchanger conduit 256 (Fig. 3). The lower end 306 of the coiled tubing 296 passes downwardly through a channel 308 formed in the housing flange 66 and through a communicating channel 310 extending through the adjacent outer edge portion of the annular plate 70'. The hermetic integrity of the motor pump unit is ensured by annular sealing welds 312 and 314 formed respectively at the lower openings of each of the channels 308 and 310 and joining the coiled tubing end 306 to the housing flange 66 and the annular plate 70'. The opening 242 of the pump casing 56 for the external heat exchanger 244 of Figs. 1-3 is omitted, of course, in the arrangement of Fig. 4.

In the operation of the lubricant cooling system as arranged in accordance with Fig. 4, the lubricant expelled from the annular chamber 126 within the thermal barrier and bearing holder arrangement 128 flows outwardly into the second annular chamber 238' as denoted by flow arrow 316. From the second annular chamber 238' the lubricant flows upwardly through the coiled tubing and back into the upper portion of the motor section as denoted by flow arrows 318 and 320, respectively. From the top portion of the motor housing the lubricant then flows downwardly thereof through the motor bearings and motor gap as described previously in connection with Figs. 1-3 of the drawings.

From the foregoing it will be seen that novel and efficient forms of a motor pump combination have been disclosed and described herein. It is intended that the accompanying descriptive material be employed for exemplifying the invention and not be interpreted as limitative thereof. For example, it is contemplated that certain features of the invention can be employed generally in dynamoelectric machinery.

Numerous embodiments of the invention, therefore, will occur to those skilled in the art without departing from the spirit and scope of the invention. It is to be understood moreover that certain features can be utilized with a corresponding use of other features.

Accordingly, what is claimed as new is:

1. A dynamoelectric machine comprising a housing capable of retaining a lubricating fluid therein, a driving shaft, antifrictional means for mounting said shaft for rotation within said housing, a rotor secured to said shaft for rotation therewith, a hollow stator assembly mounted within said housing and juxtaposed of said rotor, a thrust runner coupled to said driving shaft for rotation therewith, a thrust bearing mounted within said housing in bearing contact with said thrust runner, said housing having flow passages therein for conveying lubricating fluid through said antifrictional means and said thrust bearing, an opening extending through said thrust runner, said thrust runner having a fluid impelling configuration formed adjacent its outer edge for impelling said fluid through said opening, an external lubricant cooling means, a fluid chamber surrounding said thrust runner, said housing having a pair of inlet and outlet openings extending therethrough and communicating with said chamber and said passages, and with said cooling means.

2. A combination thermal barrier and thrust bearing arrangement for use in a motor-pump unit or the like, said combination adapted for insertion between the motor and pump sections of said unit and comprising a pair of annular mating parts, first and second annular grooves formed respectively on the confronting surfaces of said parts, said grooves being spaced radially along said confronting surfaces, a third annular groove formed in the outer surface of one of said parts and facing said motor section, an annular plate seated and hermetically sealed in said third groove to enclose a stagnant volume within said third groove, means for joining and hermetically sealing said mating parts to enclose stagnant volumes within said first and said second grooves, a thrust bearing, means coupled to said last-mentioned part for securing said thrust bearing upon said annular plate, all of said grooves being arranged in the path of heat conduction through said mating parts from said pump section to said thrust bearing.

3. In a motor-pump unit, the combination comprising, a housing, a driving shaft mounted for rotation within said housing, said housing being divided into a pump section and a motor section, a rotor disposed in said motor section and secured to said shaft for rotation therewith, a pump impeller secured to said shaft and disposed within said pump section, a hollow stator mounted within said housing in a position juxtaposed to said rotor, an annular thermal barrier mounted within said housing at a position between said motor and said pump sections, a thrust runner secured to said driving shaft, a thrust bearing, said thermal barrier having an annular groove facing said thrust runner, an annular plate seated and hermetically sealed in said groove to enclose a stagnant volume therein, said thrust bearing being mounted on said annular plate for bearing contact with said thrust runner.

4. In a motor-pump unit, the combination comprising, a housing, a driving shaft mounted for rotation within said housing, said housing being divided into a pump section and a motor section, a rotor disposed in said motor section and secured to said shaft for rotation therewith, a pump impeller secured to said shaft and disposed within said pump section, a hollow stator mounted within said housing in a position juxtaposed to said rotor, an annular thermal barrier mounted within said housing at a position between said motor and said pump sections, a thrust runner secured to said driving shaft, a pair of thrust bearings, said thermal barrier having an annular groove facing said thrust runner, an annular plate seated and hermetically sealed in said groove to enclose a stagnant volume therein, said thrust bearings being mounted on said annular plate for bearing contact with said thrust runner, and means for mounting the other of said thrust bearings adjacent the opposite surface of said thrust runner.

5. In a motor-pump unit, the combination comprising, a housing, a driving shaft mounted for rotation within said housing, said housing being divided into a pump section and a motor section, a rotor disposed in said motor section and secured to said shaft for rotation therewith, a pump impeller secured to said shaft and disposed within said pump section, a hollow stator mounted within said housing in a position juxtaposed to said rotor, an annular thermal barrier mounted within said housing at a position between said motor and pump sections, a thrust runner secured to said driving shaft, a thrust bearing, said thermal barrier having a first annular groove facing said thrust runner, an annular plate seated and hermetically sealed in said groove to enclose a stagnant heat-insulating volume therein, said thrust bearing being mounted on said annular plate for bearing contact with said thrust runner, said thermal barrier in addition comprising a pair of annular mating parts, the confronting surfaces of said parts having second and third annular grooves formed respectively therein, said last-mentioned grooves being spaced radially along said surfaces and all of said grooves being disposed in the path of heat conduction from said pump section to said thrust bearing, means for joining and hermetically sealing said mating parts to enclose stagnant volumes within said second and said third grooves, said housing having fluid circulating passages therein for supplying lubricant to said bearings, and pumping means for circulating fluid through said passages.

6. A motor-pump unit comprising, a housing, a driving shaft mounted on antifrictional means within said housing, said housing being divided into a motor section and a pump section, a rotor disposed in said motor section and secured to said driving shaft for rotation therewith, an impeller disposed in said pump section and secured to said driving shaft for rotation therewith, a hollow stator assembly surrounding said rotor, a thrust runner secured to said driving shaft, a thermal barrier disposed between said thrust runner and said pump section, said thermal barrier comprising a pair of annular mating parts, first and second annular grooves formed respectively on the confronting surfaces of said parts, said grooves being spaced radially from one another along said surfaces, means for joining and hermetically sealing said parts to enclose stagnant volumes within said grooves, a third annular groove formed on one of said parts facing said thrust runner, an annular plate seated and hermetically sealed in said third groove to enclose a stagnant volume therein, a labyrinthine seal formed on the inner periphery of one of said parts and disposed adjacent said driving shaft, a pair of thrust bearings, means for mounting one of said thrust bearings upon said annular plate for engagement with said thrust runner, all of said grooves being disposed in the path of heat conduction from said pump section to said thrust bearings, means for mounting the other of said thrust bearings at the opposite side of said thrust runner, at least one flow passage extending through said thrust runner and disposed radially inwardly of said thrust bearings, said passage and said labyrinthine seal being communicating to admit a limited flow of lubricant to said thrust bearings, said housing having lubricant flow passages therein communicating with said seal and with said thrust runner passage, and means for impelling lubricant through said passages.

7. In a dynamoelectric machine, the combination comprising a low temperature housing, a high temperature casing, a hollow stator assembly mounted within said housing, a rotor and shaft mounted for rotation within said assembly, said assembly including an annular plate disposed generally between said housing and said casing, said plate having an outwardly extending flange inserted in the junction between said housing and said casing, means for joining said housing to said casing, sealing means mounted on at least one of the confronting surfaces of said housing and said casing and said flange, whereby the force of said joining means is transmitted entirely through said flange and said sealing means, and an annular thermal barrier inserted generally in the path of heat conduction between said housing and said casing, said thermal barrier surrounding said shaft and being secured to said annular plate.

8. In a dynamoelectric machine, the combination comprising a low temperature housing, a high temperature casing, a hollow stator assembly mounted within said housing, a rotor and shaft mounted for rotation within said assembly, said assembly including an annular plate disposed generally between said housing and said casing, said plate having an outwardly extending flange inserted in the junction between said housing and said casing, means for joining said housing to said casing, and sealing means mounted on at least one of the confronting surfaces of said housing and said casing and said flange, whereby the force of said joining means is transmitted entirely through said flange and said sealing means, a thrust runner secured to said shaft at a position adjacent said annular plate, and a thrust bearing member secured to said annular plate for engagement with said thrust runner.

9. In a dynamoelectric machine, the combination comprising a low temperature housing, a high temperature casing, a hollow stator assembly mounted within said housing, a rotor and shaft mounted for rotation within said assembly, said assembly including an annular plate disposed generally between said housing and said casing, said plate having an outwardly extending flange inserted in the junction between said housing and said casing, means for joining said housing to said casing, and sealing means mounted on at least one of the confronting surfaces of said housing and said casing and said flange, whereby the force of said joining means is transmitted entirely through said flange and said sealing means, a thrust runner secured to said shaft at a position adjacent said annular plate, and a thrust bearing member secured to said annular plate for engagement with said thrust runner, an annular thermal barrier inserted generally in the path of heat conduction between said housing and said casing, said thermal barrier surrounding said shaft and being secured to said annular plate.

10. In a dynamoelectric machine, the combination comprising a low temperature housing, a high temperature casing, a hollow stator assembly mounted within said housing, a rotor and shaft mounted for rotation within said assembly, said assembly including an annular plate disposed generally between said housing and said casing, said plate having an outwardly extending flange inserted in the junction between said housing and said casing, means for joining said housing to said casing, and sealing means mounted on at least one of the confronting surfaces of said housing and said casing and said flange, whereby the force of said joining means is transmitted entirely through said flange and said sealing means, a thrust runner secured to said shaft at a position adjacent said annular plate, and an up-thrust bearing member secured to said annular plate for engagement with said thrust runner, an annular thermal barrier inserted generally in the path of heat conduction between said housing and said casing, said thermal barrier surrounding said shaft and being secured to said annular plate, said thermal barrier in addition being disposed adjacent said thrust runner, and a down thrust bearing mounted on said thermal barrier and disposed for engagement with the adjacent side of said thrust runner.

11. A thermal barrier for a motor-pump unit or the like, said thermal barrier comprising a pair of mating parts of generally annular configuration, the confronting surface of each of said parts having an annular groove formed therein, said grooves being radially spaced from one another along said confronting surfaces, and means for hermetically sealing said component parts together at their adjacent exterior edges, respectively in order to enclose stagnant volumes within said grooves, said stagnant volumes being disposed to limit the conduction of heat through said thermal barrier.

12. A thermal barrier for a motor-pump unit or the like, said thermal barrier comprising a pair of mating parts of generally circular configuration, the confronting surface of each of said parts having an annular groove formed therein, said grooves being radially spaced from one another along said confronting surfaces, means for joining and hermetically sealing said component parts together in order to enclose stagnant volumes within said grooves, and a plurality of circumferential grooves formed upon the inner periphery of at least one of said parts, said last-mentioned grooves being closely spaced in order to form a plurality of relatively thin ridges at said inner periphery.

13. A combination thermal barrier and thrust bearing arrangement for use in a motor-pump unit or the like, said combination adapted for insertion between the motor and pump sections of said unit and comprising a pair of annular mating parts, first and second annular grooves formed respectively on the confronting surfaces of said parts, said grooves being spaced radially along said confronting surfaces, means for joining and hermetically sealing said mating parts to enclose stagnant volumes within said first and said second grooves, a thrust bearing, means coupled to said thrust bearing for securing said thrust bearing upon a surface of one of said parts facing said motor section, said grooves being arranged in the path of heat conduction through said mating parts from said pump section to said thrust bearing.

14. In a motor-pump unit, the combination comprising, a housing, a driving shaft mounted for rotation within said housing, said housing being divided into a pump section and a motor section, a rotor disposed in said motor section and secured to said shaft for rotation therewith, a pump impeller secured to said shaft and disposed within said pump section, a hollow stator mounted within said housing in a position juxtaposed to said rotor, an annular thermal barrier mounted within said housing at a position between said motor and said pump sections, a thrust runner secured to said driving shaft, a downthrust bearing, said downthrust bearing being mounted on a surface of said thermal barrier facing said motor section for bearing contact with said thrust runner, an upthrust bearing, and means for mounting said upthrust bearing in opposed relation to said downthrust bearing for bearing contact with said thrust runner.

References Cited in the file of this patent

UNITED STATES PATENTS

| | | |
|---|---|---|
| 2,475,118 | Wolfe et al. | July 5, 1949 |
| 2,682,836 | Orr | July 6, 1954 |
| 2,741,990 | White | Apr. 17, 1956 |
| 2,768,584 | Nicol et al. | Oct. 30, 1956 |
| 2,845,871 | Compton | Aug. 5, 1958 |
| 2,902,935 | Dinnison et al. | Sept. 8, 1959 |